United States Patent [19]

Petersen

[11] Patent Number: 4,497,557

[45] Date of Patent: Feb. 5, 1985

[54] ELECTROMAGNETIC SHUTTER MECHANISM

[75] Inventor: Christian C. Petersen, Westwood, Mass.

[73] Assignee: Polaroid Corporation, Cambridge, Mass.

[21] Appl. No.: 392,315

[22] Filed: Jun. 25, 1982

[51] Int. Cl.³ .............................................. G03B 9/14
[52] U.S. Cl. ........................................... 354/234.1
[58] Field of Search ............ 354/226, 228, 230, 231, 354/234, 235, 271

[56] References Cited

U.S. PATENT DOCUMENTS

| | | | |
|---|---|---|---|
| 3,654,845 | 4/1972 | Fahlenberg et al. | 95/53 EB |
| 3,781,099 | 12/1973 | Williams et al. | 352/141 |
| 3,782,255 | 1/1974 | Boerner | 95/10 C |
| 3,882,522 | 5/1975 | Erlichman | 354/30 |
| 3,942,183 | 3/1976 | Whiteside | 354/29 |
| 4,024,552 | 5/1977 | Kondo | 354/234 |
| 4,051,499 | 9/1977 | Kondo | 354/234 |
| 4,079,400 | 3/1978 | Kondo | 354/234 |
| 4,121,235 | 10/1978 | Fujita et al. | 354/234 |
| 4,162,831 | 7/1979 | Gold | 354/31 |
| 4,171,897 | 10/1979 | Fujita et al. | 354/234 |
| 4,222,652 | 9/1980 | Ishiguro | 354/234 |
| 4,240,728 | 12/1980 | Wiedmann et al. | 354/38 |
| 4,265,530 | 5/1981 | Petersen | 354/235 |
| 4,306,788 | 12/1981 | Ogawa et al. | 354/49 |
| 4,313,659 | 2/1982 | Saito et al. | 354/234 |
| 4,322,145 | 3/1982 | Yamada et al. | 354/50 |
| 4,333,722 | 6/1982 | Lee | 354/234 |
| 4,338,009 | 7/1982 | Lee | 354/152 |
| 4,348,092 | 9/1982 | Hirohata et al. | 354/230 |
| 4,348,094 | 9/1982 | Hirohata et al. | 354/234 |

Primary Examiner—John Gonzales
Attorney, Agent, or Firm—Leslie J. Payne

[57] ABSTRACT

A compact shutter mechanism is disclosed for controlling the unblocking and blocking of a light admitting opening through which light passes along a given path. Included in the mechanism is a plurality of a first group of shutter blade assemblies, as well as means for mounting the assemblies so that each is movable between unblocking and blocking conditions and each is generally parallel to a given plane. Each of the blade assemblies includes at least a permanent magnet having its magnetic field extending generally transversely to the given plane. Means for driving the assemblies between their blocking and unblocking condition include at least a first coil arrangement having active conductor portions generally parallel to the given plane. Each of the active portions is juxtaposed to respective ones of the magnetic fields so that when energized with reverse polarity each of the blade assemblies is driven between the unblocking and blocking conditions.

4 Claims, 5 Drawing Figures

ELECTROMAGNETIC SHUTTER MECHANISM

BACKGROUND OF THE INVENTION

This invention relates to shutter mechanisms and, in particular, electromagnetically driven shutter mechanisms.

A wide variety of shutter mechanisms have been used in cameras. These tend to be mechanically sophisticated in construction as well as operation. Typically, shutter blades are rotated, pivoted or generally linearly reciprocated with respect to each other for controlling the passage of light along an optical path. U.S. Pat. Nos. 3,781,099; 3,782,255; and 3,942,183 are illustrative of different kinds of shutter blades. Usually, these mechanisms include a stored energy device, such as a mechanically tensioned spring, for driving the shutter blades to an open condition. These systems function satisfactorily and provide commercially acceptable reliability. Because of their relative intricacy in construction and operation, however, they have certain limitations. For instance, use of tensioned spring mechanisms gives relatively fixed characteristics (not programmable). Moreover, they tend to be relatively large, bulky and susceptible to failure. Because they are mechanically driven, their dynamic performance is not as accurate or reliable as it could be.

Various proposals have been made for improving upon such shutter mechanisms. Moreover, with the advent of miniature cameras, there has also been developed a need for miniature shutter mechanisms. Obviously, the use of relatively large springs for driving the shutter blades in miniature cameras is unsuitable.

Some proposals have suggested replacing the spring tensioning mechanism with an electromagnetic actuator. In this regard, U.S. Pat. No. 4,024,552 even discloses shutter blades which actually form part of the electromagnetic actuator. However, this actuator nevertheless uses springs for returning the blades to their blocking condition. In fact, a number of shutter mechanisms using an electromagnetic actuator for driving the shutter blades to an unblocking condition rely upon springs for returning the blades to their blocking condition. Thus, springs are still required.

Besides, conventional electromagnetic actuators, in general, employ annular field coils with magnets moving into and out of their core. These are considered bulky. Hence, the overall configuration of the shutter mechanism is bulky and less than ideal for miniaturization. Moreover, use of annular field coils in these actuators is not highly efficient.

There have been proposals for springless shutter mechanisms. One such proposal is described in commonly-assigned U.S. Pat. No. 3,882,552. This patent discloses use of a rotary stepper motor for driving the shutter blades between open and closed orientations. A shortcoming is that the rotary stepper motor is somewhat bulky. Another proposal for a springless shutter mechanism is described in commonly-assigned U.S. Pat. No. 4,265,530, issued to the inventor of the instant application. The system described uses not only a linear motor, but an electromagnetic clutching mechanism for driving the shutter blades between unblocking and blocking conditions.

Another proposal for a springless shutter is disclosed generally in U.S. Pat. No. 4,121,235. In this patent, there is disclosed an electromagnetic shutter mechanism employing a pair of solenoids having annular field coils which actuate a pair of shutter blades interconnected through a force transmitting lever. There are a number of drawbacks associated with this approach. For instance, such an actuator uses bulky and relatively inefficient solenoids.

SUMMARY OF THE INVENTION

In accordance with the present invention, the aforenoted shortcomings mentioned above in connection with prior art shutter mechanisms are overcome. This is brought about by the provision of an improved shutter mechanism embodying the principles of the present invention.

As in prior shutter mechanisms for use in controlling the unblocking and blocking of an opening through which light passes along a given path, there are a plurality of blade assemblies. The mechanism includes means for mounting the blade assemblies so that each is movable between unblocking and blocking conditions and each is generally parallel to a given plane. When the blade assemblies are moved to an unblocking condition, they define progressively changing aperture values. In these prior shutter mechanisms, means are operable for driving the blade assemblies between the closed and open conditions for defining an exposure interval.

In an illustrated embodiment of the invention, each of the blade assemblies includes at least a permanent magnet having a magnetic field extending generally transversely to the given plane. The driving means according to the present invention includes a field coil arrangement having active conductor portions extending generally parallel to the given plane. Respectives ones of the active conductor portions is juxtaposed to respective ones of the magnets. The active conductor portions are arranged so that when each is energized with the same polarity, each of the blade assemblies is commonly driven in a direction which causes the assemblies to move between the unblocking and blocking conditions.

In another embodiment, each of the blade assemblies includes a pair of permanent magnets spaced apart with respect to each other and to an aperture formed in each of the blade assemblies. These opposing pairs of magnetic domains have opposite polarity and fields extending generally transversely to the given plane. In this embodiment, the active conductor portions are arranged with respect to the opposing pairs of domains such that when energized with a reverse polarity, each of the blade assemblies moves between the unblocking and blocking conditions for defining an exposure interval.

In a further embodiment, there is a pair of blade assemblies, each of which is oriented generally transversely with respect to the other, wherein the transversely mounted blades have a pair of coinciding apertures movable into and out of coincidence.

A still further embodiment is defined by a second group of blade assemblies. Each assembly of the second group includes a pair of magnetic domains spaced apart with respect to each other. These assemblies are mounted generally parallel to the first group and are movable between unblocking and blocking conditions with respect to each other. The pair of magnetic domains has magnetic fields of opposite polarity extending generally transversely to the given plane. Also, the driving means further includes a second coil arrangement having active conductor portions which are juxtaposed generally parallel to the given plane and to the pair of domains of the blade assemblies of the second group. The active conductor portions are arranged with respect to the magnetic domains such that when energized with reverse polarity the assemblies move between unblocking and blocking conditions.

Among the objects of the invention are, therefore, a shutter mechanism which is extremely simple and compact in construction and operation; the provision of an improved shutter mechanism which does not need spring mechanisms for driving purposes; the provision of a single coil arrangement for driving a plurality of blade members with respect to each other between unblocking and blocking conditions; the provision of an improved shutter mechanism wherein the single coil is generally planar to the shutter blades for space saving and efficiency purposes; the provision of an improved shutter mechanism wherein a cooperating pair of shutter blades can be driven transversely with respect to each other; and the provision of an improved shutter mechanism wherein at least a pair of generally planar coil arrangements can be used for driving separate groups of generally parallel blade members.

Other objects and further scope of applicability of the present invention will become apparent from the detailed description to follow when taken in conjunction with the accompanying drawings in which like parts are designated by like reference numerals.

DETAILED DESCRIPTION

Figure 1:
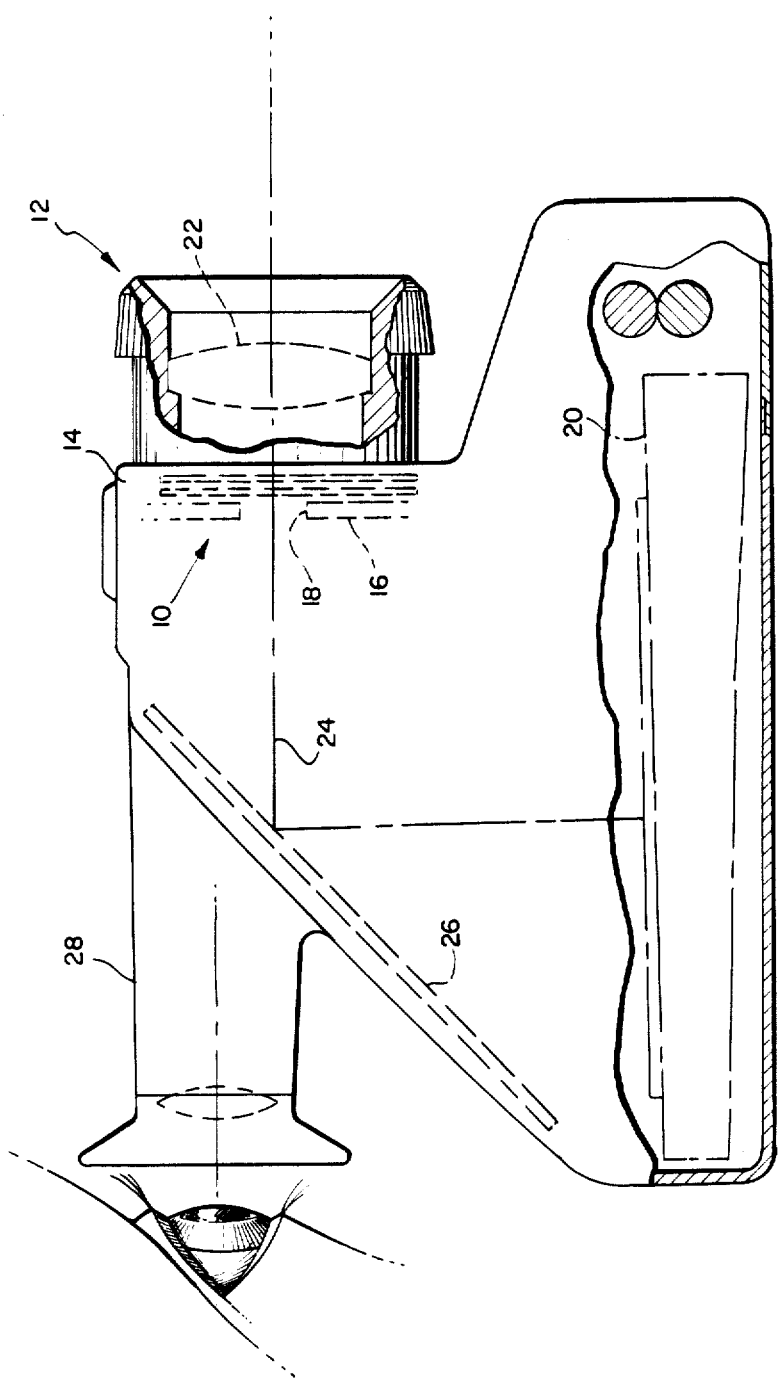
FIG. 1 is a diagrammatic side elevational view depicting a photographic camera incorporating the improved shutter mechanism of the present invention.

Referring now to FIG. 1, it can be seen that the improved shutter mechanism 10 of the present invention is contained within a photographic camera 12. However, it is to be understood that the shutter mechanism of the present invention can be used not only in photographic apparatus, but also other apparatus, such as machines for preparing microfiche. Included within a camera housing 14 is a rear block casting 16 constructed to support components of the shutter mechanism 10. Since the block casting 16 will support permanent magnets, it is made of a non-magnetic and non-conducting plastic material. A light exposure aperture 18 is formed within the casting 16 and defines the maximum available exposure aperture 18. The light exposure aperture 18 also allows passage of scene light to a photographic film unit (not shown) of a film pack 20. Examples of such a film pack 20 are described in U.S. Pat. Nos. 3,543,662; 3,705,542; 3,748,948; and, 3,779,770. Each of the film units of the pack 20 is successively positioned at the focal plane of the camera. It is noted that the camera 12 is of the self-developing type usable with a film pack of the type manufactured and sold by the Polaroid Corporation, Cambridge, Mass.

Mounted on a front wall of the camera housing 14 is a taking or objective lens 22 of the fixed-focus type. The taking lens 22 focuses the image-carrying rays from the scene to be photographed along an exposure path, indicated by reference numeral 24, to a mirror 26. Although the objective lens 22 is illustrated as a fixed-focus type, it is to be understood that an adjustable lens assembly may be used instead. From the mirror 26, the image-carrying rays are reflected to the uppermost film unit of the film pack 20. Additionally, a viewing window (not shown) is located in the front face of the camera housing 14 and operates as part of a viewing system 28 for permitting viewing and framing of the scene to be photographed. Control of the exposure is provided by an exposure control system (not shown). Since the exposure control system does not form an aspect of the present invention, details as to its construction and complete operation are omitted.

Figure 2:
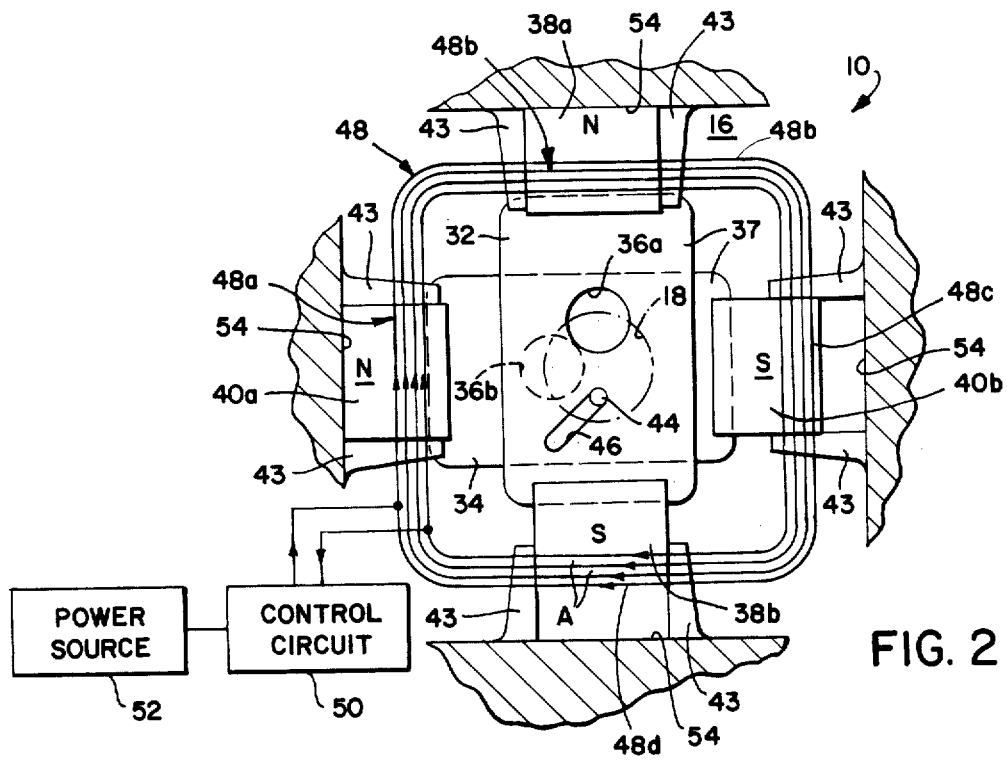
FIG. 2 is an elevational view diagrammatically depicting a shutter blade mechanism of FIG. 1 in an initially closed condition.
Figure 3:
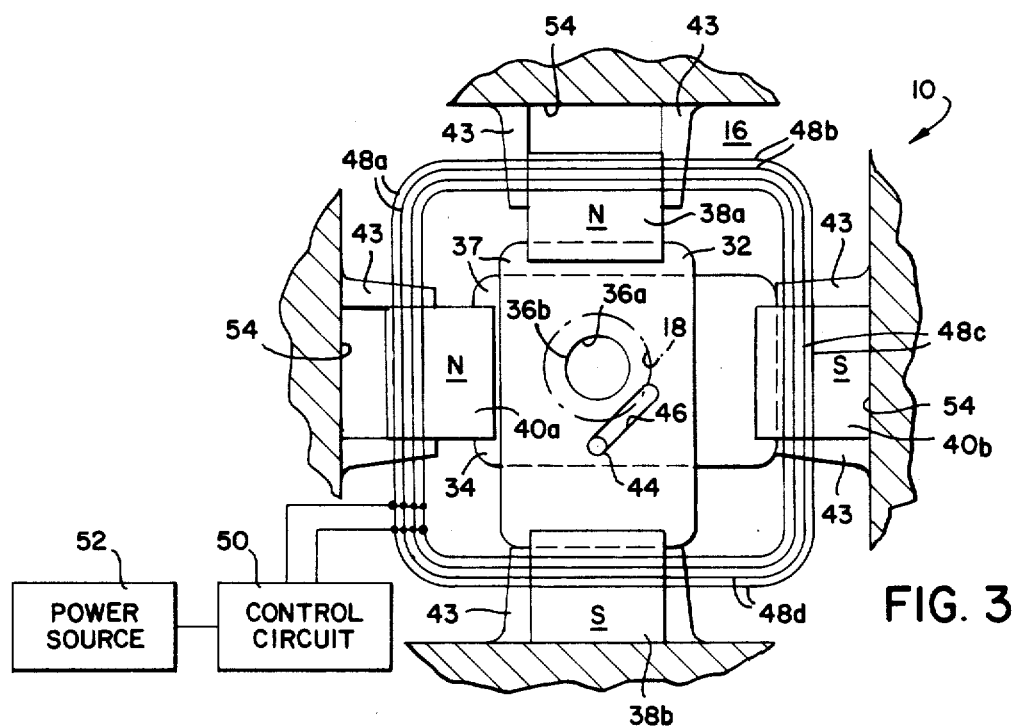
FIG. 3 is a view similar to FIG. 2 but showing the shutter blade mechanism in an open condition.

Reference is now made to FIGS. 2 and 3 which when taken in conjunction with FIG. 1 better show the constructional and positional arrangement of the shutter mechanism 10. Included in the shutter mechanism 10 is a pair of generally parallel blade assemblies 32, 34. The blade assemblies 32, 34 are in overlapping relationship and are mounted for reciprocal movement on the block casting 16 intermediate the objective lens 22 and the light exposure opening 18. Each of the blade assemblies 32, 34 is formed with a suitably formed scene light admitting primary aperture 36a, 36b; respectively, in the generally flat central portion 37 thereof. The flat central portion 37 are generally parallel to the plane defined by the block casting 16. For purposes of illustration only, these apertures 36a, 36b are circular. It will be appreciated though that these apertures can have any number of suitable configurations which allow them to form changing aperture values consistent with the exposure requirements of the camera. The primary apertures 36a, 36b are arranged to overlap and coincide progressively with respect to each other and the light exposure opening 18 so as to define progressively increasing aperture values. The aperture values are a function of blade positioning during an exposure interval.

The blade assemblies 32, 34 each include at opposite end portions thereof a pair of spaced-apart, permanent magnets 38a, 38b; 40a, 40b; respectively. Each permanent magnet is, preferably, formed of a rare earth magnet material, such as samarium cobalt. In the illustrated embodiment, the magnets 38a, 38b and 40a, 40b have a generally rectangular and planar configuration, and are juxtaposed in generally parallel relationship to the block casting 16. Further, it will be noted that the permanent magnets 38a, 38b; 40a, 40b are arranged such that each pair has opposite magnetic polarity extending generally transversely to the plane of the block casting 16. Thus, the magnet 38a has its north pole N facing upwardly, while the magnet 38b has its south pole S facing upwardly. In this regard, the magnet 40a has its north pole N facing upwardly, while the magnet 40b has its south pole S facing upwardly. The polarity of each pair of magnets can be reversed if desired. Although not shown, the permanent magnets 38a,b; 40a,b may be encased in a non-magnetic and non-conducting plastic jacket. The magnets 38a,b, 40a,b are retained for reciprocating between guiding shoulders 43 formed on the casting 16. Also provided are retaining members (not shown) which are connected to the block casting 16 for retaining the blade assemblies 32, 34 in their noted parallel relationship. The foregoing provides means for mounting the blade assemblies for movement between their blocking and unblocking conditions. As mounted on the block casting 16, the blade assembly 32 can reciprocate along a generally horizontal axis, while the blade assembly 34 reciprocates in a direction generally transverse to the blade assembly 32. As will be explained in detail, reciprocatory movement of the shutter blade assemblies 32, 34 effects movement of the primary apertures 36a,b from their closed or blocking condition (FIG. 2) to their open or unblocking condition (FIG. 3) and back again to their blocking condition.

One way to insure that the blade assemblies 32, 34 move at the same speed is to provide the blade assembly 34 with a post 44 which slides in an oblique slot 46 formed in the blade assembly 32. The slot 46 is oriented at about 45° relative to the axis of the blade assembly 32 for insuring that the blade assemblies move at the same speed.

Means for displacing the shutter blade assemblies 32, 34 is provided, in part, by a single planar field coil 48. The field coil 48 is in generally parallel relationship with respect to the permanent magnets 38a,b; 40a,b. Because the field coil 48 is generally flat, it can be placed closely adjacent the blade assemblies 32, 34. Advantageously, this provides for an extremely thin and compact shutter mechanism.

In this embodiment, the field coil 48 is shown to be generally rectangular with its windings connected to a suitable control circuit 50. The control circuit 50 regulates current from an appropriate source 52 of, preferably, DC electrical power through the field coil 48. The control circuit can reverse the polarity of the current flowing through the coil. By reversing polarity the direction of current flow through the field coil reverses. Such a reversal, as will be explained, can cause reverse directional movement of the blade assemblies. One direction is indicated by the arrows A. The control circuit 50 regulates the amplitude and polarity of the electric current passing through the coil 48. Thus, the speed and direction of the shutter blade assemblies 32, 34 can be controlled. The field coil 48 can be encased in a suitable non-conducting, non-magnetic plastic jacket. The jacket has not been shown for sake of clarity in illustrating the present invention. The magnets 38a,b; 40a,b can be arranged to slide against the plastic jacket. The field coil 48 is held stationary with respect to the block casting 16 and may be fixedly connected thereto through conventional connecting means.

As viewed in FIGS. 2 and 3, the windings of the field coil 48 are divisible into four interconnected active conductor portions 48a-d. As used in the specification and claims, active conductor portions refer to those portions of the conductor within the magnetic fields of the permanent magnets 38a,b; 40a,b. Each of the active conductor portions 48a-d is generally transversely oriented with respect to its adjacent portions. The opposing pairs of magnets 38a,b; 40a,b are arranged with respect to the opposing pairs of active conductor portions 48a, 48c; and 48b, 48d; respectively. Thus, when the planar field coil 48 is energized, the coil portions 48a have current flowing through it in one direction, while the opposing coil portions 48c have current flowing through it in the opposite direction. Similarly, coil portions 48b have current flowing through it in one direction which will be opposite to current flowing in the coil portions 48d.

Operation of the shutter mechanism 10 is as follows. For purposes of driving the shutter blade assemblies 32, 34 from their blocking orientation (FIG. 2) to their unblocking orientation (FIG. 3), current of a given polarity is directed by the control circuit 50 to the planar field coil 48. The direction of the current in this particular mode is indicated by the arrows A. As a consequence, the coil portions 48a interact with the north magnetic field of the permanent magnet 40a so as to drive the blade assembly 34 rightwardly. This rightward driving force is reinforced by the rightward force derived by the interaction of the current flowing in the coil portions 48c and the south pole S of the permanent magnet 40b. Downward movement of the shutter blade assembly 32 is effected by reason of the interaction of the north pole N of the blade magnet 38a with the current in the coil portions 48, and the current in the coil portions 48 interacting with the south pole S of the magnet 38b. In this manner, the shutter blade assembly 32 is driven downwardly, such that its aperture 36a coincides progressively with the aperture 36b of the blade assembly 34. These aperture values progressively change with respect to the exposure aperture 18. Reciprocatory movement of the shutter blade assemblies 32, 34 is limited by suitable abutments 54 formed on the block casting 16. The degree to which the primary apertures 36a,b overlap to define the exposure interval is controlled by the control circuit 50 which, in turn, is controlled by a suitable exposure control circuit (not shown) which controls current and amplitude flowing in the field coil 48. Thereafter, the control circuit 50 can be operated to reverse the polarity of current flowing through the field coil 48. Thus, the current flows through the field coil 48 in a direction opposite to that indicated by arrows A. As a result, the active conductor portions 48a-d each interact with the associated magnetic fields 38a,b; 40a,b to drive the blade assemblies 32, 34 in opposite directions; that is, towards their blocking condition (FIG. 2). As this occurs, of course, the apertures 36a, 36b are driven out of coincidence.

The foregoing arrangement provides a highly efficient and extremely thin, shutter mechanism. This shutter mechanism defines significant advantages over known electromagnetic shutter mechanisms especially ones using conventional annular coils. The shutter blade mechanism of this invention is significantly less complex and complicated and more efficient than known types.

The previous embodiment discloses a pair of transversely mounted blade assemblies and a generally rectangular single field coil in generally parallel and juxtaposed relationship to the blades. The invention envisions a larger number of blade assemblies can be driven by the single field coil. In this regard, the single field coil could have an annular configuration, with each blade assembly having its pair of opposed permanent magnets of opposite polarity cooperating with diametrically opposed active conductor portions of the annular field coil. In this manner, the current would flow across the field of the opposed pair of permanent magnets in opposite directions. In this embodiment the shutter blade assemblies are provided with apertures. However, it is to be understood that the present invention envisions a shutter blade mechanism wherein the blades do not have apertures therein, but cooperate with each other in such a fashion as to define progressively changing aperture values.

Figure 4:
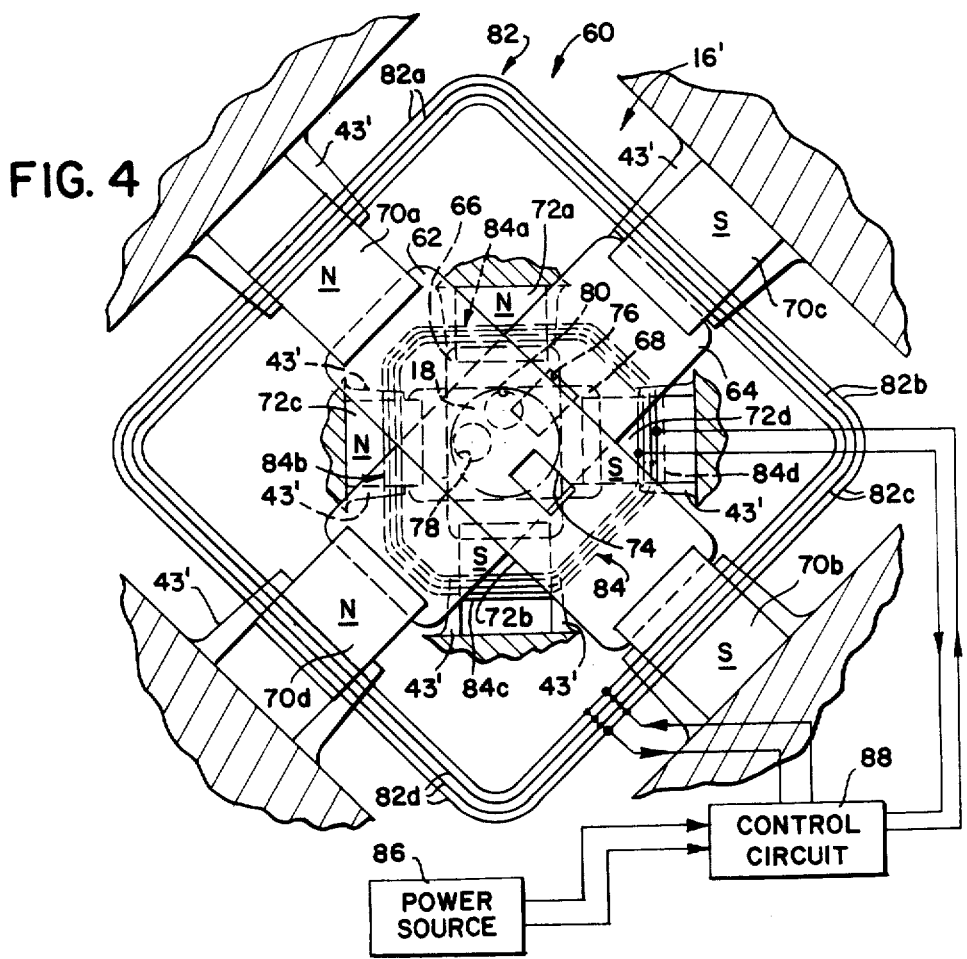
FIG. 4 is an elevational view diagrammatically depicting another embodiment of a shutter mechanism according to the present invention in a closed condition; and, FIG. 5 is an elevational view similar to FIG. 4 but showing the shutter blade mechanism in an open condition.
Figure 5:
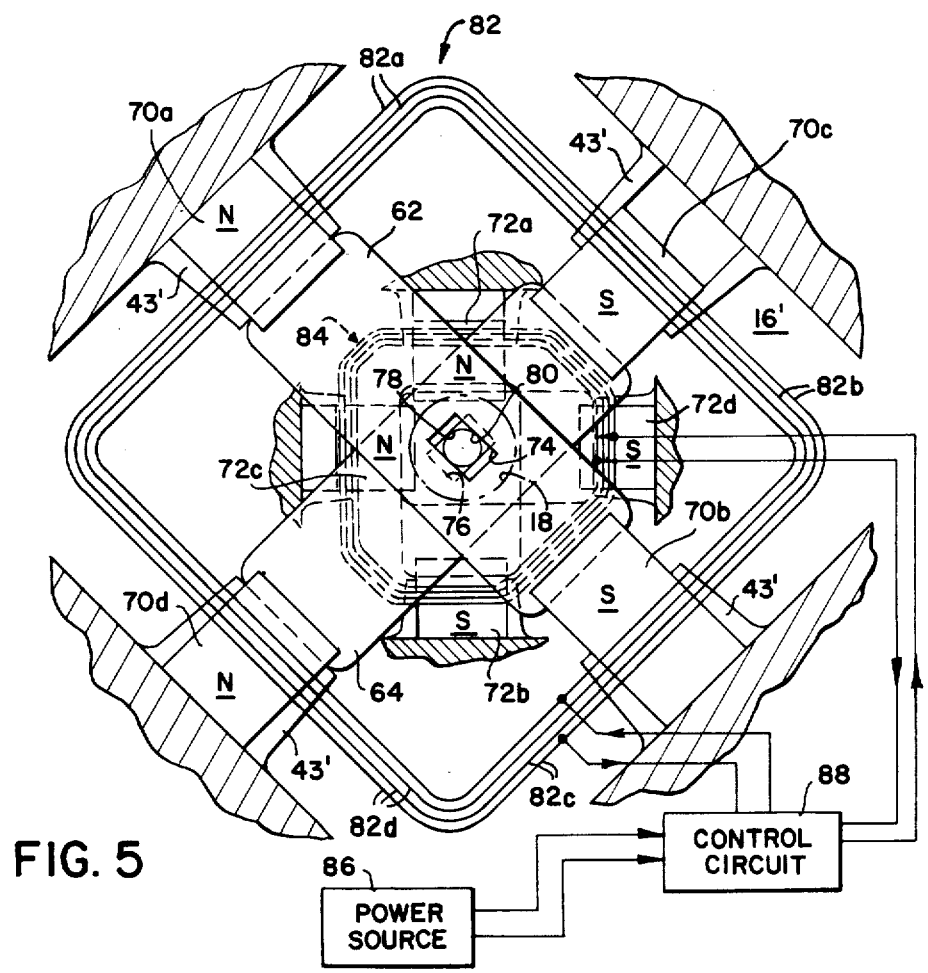

Reference is now made to FIGS. 4 and 5 for showing yet another embodiment of a shutter mechanism 60 made according to the present invention. Structure of this embodiment which is like structure of the previously-described embodiment will have the same reference numeral, but with the addition of a prime marking. Included in the shutter mechanism 60 are two pairs of generally parallel shutter blade assemblies 62, 64; 66, 68; respectively. The shutter blade assemblies 62, 64 include a pair of permanent magnets 70a,b; 70c,d; respectively, secured to opposing ends thereof, while the shutter blade assemblies 66, 68 include a pair of permanent magnets 72a,b; 72c,d; respectively, attached to the opposing ends thereof. Preferably, the permanent magnets 70a–d and 72a–d are of the rare earth type, such as samarium cobalt. In this embodiment, these permanent magnets are generally rectangular in configuration and have generally planar faces. Their fields extend generally transversely to the block casting 16' which defines a given plane. Returning to the permanent magnets 70a,b, they have their planar faces with opposite magnetic polarity. In this embodiment, the magnets 70a,b have their respective north pole N and south pole S facing upwardly. Each of the shutter blades 62, 64 includes apertures 74, 76; respectively. These apertures 74, 76 are normally out of coincidence with respect to each other when the shutter blades 62, 64 are in their closed or blocking orientation (FIG. 4). The shutter blade assemblies 62, 64 are arranged to reciprocate with respect to each other between the closed or blocking condition (FIG. 4) and an open or unblocking orientation (FIG. 5). When the blade assemblies 62, 64 move to their open position, the apertures 74, 76 progressively coincide until they permit passage of scene light through the aperture opening 18'. During such movement they define progressively changing aperture values.

The shutter blade assemblies 66, 68 are likewise arranged to reciprocate between open and closed conditions. See FIGS. 4 and 5. Their apertures 78, 80 move into and out of coincidence. These shutter apertures 78, 80 function to control the start and termination of an exposure cycle, whereas the apertures 74, 76 function to define the aperture stop. Although not shown, each pair of the shutter blade assemblies can be provided with a cooperating pin and slot as described in the last embodiment. These pins and slots have been omitted from the drawing for sake of clarity in illustrating the embodiment.

The shutter blade assemblies 62, 64; 66, 68 are driven in a reciprocating fashion by respective flat field coils 82, 84. In this embodiment, the field coil 82 is generally rectangular. The field coils 82, 84 can be encased in a generally non-conducting and non-magnetic plastic jacket (not shown), against which the permanent magnets 70a–d can be arranged to slide against. Whatever the configuration of the field coils 82, 84, they should be such that opposed active conductor portions 82a, 82c of the field coil 82 are within the fields of the opposed pair of permanent magnets 70a,c; respectively, whereas the opposed conductor portions 82b,d are within the fields of the opposed permanent magnets 70b,d; respectively. The coil 82 is energized by DC current from a power source 86 as regulated by the control circuit 88. This current will flow across the north magnetic pole N of magnet 70a in one direction, while the current travels across the south magnetic pole S of the magnet 70b in the opposite direction. Also, the current will flow across the north pole N of the magnet 70c in a direction opposite to the current across the south magnetic pole 70d. In this regard, note the direction of the arrows. With the current flowing in these directions, it will interact with the permanent magnets 70a–d in a manner similar to that of the previous embodiment for driving the shutter blade assemblies 62, 64 towards their unblocking condition (FIG. 5). A reversal of the polarity of the current through the field coil 82 will cause the blade assemblies 62, 64 to move back to their blocking condition whereby the apertures 74, 76 move out of coincidence with respect to each. These blade assemblies can control the shutter function of a camera. For developing the high speeds, it is clear that current or magnetic forces can be increased for such purposes.

Reference is now made to the blade assemblies 66, 68. Essentially, they operate as the shutter blade assemblies 62, 64 except that they can be used for controlling aperture size. The field coil 84 has a polygonal configuration. Opposed active conductor portions 84a,c and 84b,d are arranged such that current when flowing through the coil 84 with a given polarity will travel in opposite directions. Thus, when the coil 84 is energized with the polarity shown in FIG. 4, the current will flow in the direction of the arrows. This current will flow across the north pole N of the magnet 72a in one direction and across to south pole S of the magnet 72b. Such will cause the blade assembly to move downwardly. Similarly, the current flow through the active portions 84b will be opposite in direction to the current in active portions 84d. These portions cross the opposing magnets 72c and 72d of opposing north and south polarity, respectively, to drive the blade assembly 68 rightwardly. Thus, the apertures 76 and 78 will come into coincidence for passing scene light through the opening 18' (FIG. 5). A reversal of polarity in the field coil 84 as regulated by the control circuit 88 will cause the blade assemblies 66, 68 to move back to their blocking condition (FIG. 4). The present invention contemplates that the pair of shutter blade assemblies operate more quickly than the aperture setting shutter blade assemblies. Towards this end, there are several approaches for achieving this. For instance, the magnitude of the current passing through the field coil 82 can be higher and/or the field strength of the permanent magnets 70a–d can be stronger.

From the foregoing description, it is clear that there is provided an extremely compact and thin shutter mechanism which obviates the need for many of the components required of conventional shutter mechanisms. Advantageously, this compact shutter is extremely easily and inexpensively manufactured and assembled, while being reliable in operation.

What is claimed is:

1. In a shutter mechanism for controlling the unblocking and blocking of an opening through which light passes along a given path comprising: a first group of shutter blade assemblies; means for mounting the shutter blade assemblies so that each is movable between unblocking and blocking conditions and each is generally parallel to a given plane, said blade assemblies being oriented with respect to each other so that when said blade assemblies are in their blocking condition, the light opening is blocked, and when in their unblocking condition the light opening is at least partially open; and means operable for driving said blade assemblies along respective paths between said unblocking and blocking conditions, the improvement wherein:

each of said blade assemblies includes at least a permanent magnet having its field extending generally transverse to the given plane;

said operable driving means includes a single energizeable coil arrangement having active conductor portions generally parallel to the given plane, respective ones of said active portions are juxtaposed in respective ones of the fields of said magnets and are generally normal to the path of movement of respective ones of said blade assemblies; said active conductor portions of said coil arrangement and permanent magnets being arranged with respect to each other so that when said active portions are energized with reverse polarity, each of said blade assemblies is driven between the unblocking and blocking conditions.

2. The mechanism of claim 1, wherein each of said blade assemblies includes a light admitting aperture, said apertures being out of coincidence when said blade assemblies are in the blocking condition and said apertures at least partially coinciding when said blade assemblies are in the unblocking condition said blade assemblies being angularly oriented with respect to each other and each includes a pair of permanent magnets spaced apart with respect to its aperture, said magnets of said pair having magnetic fields of opposite polarity extending generally transversely to the given plane, said active conductor portions arranged with respect to said magnets so that when energized with a given polarity the current traveling across one magnet of one of said blade assemblies is in a direction opposite to the current traveling across the other of said magnets on the same blade assembly, whereby when said coil arrangement is energized, said blade assemblies can move between the unblocking and blocking conditions as the polarity of current traveling through said first coil is reversed.

3. The mechanism of claim 2 wherein there is a pair of blade assemblies, each one of which is oriented substantially normal to the other so that during simultaneous movement thereof said assemblies move transversely to one another.

4. The mechanism of claim 1 or 2 further comprising a second group of shutter blade assemblies, each of said assemblies of said second set being angularly oriented with respect to the other; means for mounting the second group of shutter blade assemblies so that each is movable generally parallel to the given plane and said first group, said shutter blade assemblies of the second group being constructed and arranged so that when said second group is in a blocking condition the light opening is blocked and when in an unblocking condition, the light opening at least partially allows light therethrough, each of said blade assemblies of the second group include a pair of permanent magnets spaced apart with respect to its aperture and having magnetic fields of opposite polarity extending generally transversely to the given plane; said driving means further including a second coil arrangement having active conductor portions lying in a plane generally parallel to the given plane, each of said active conductor portions of the second group extend across respective ones of the magnets of the second group such that when said second coil arrangement is energized with current of a given polarity, the current traveling across one domain of each pair of magnets is in a direction which is opposite to the direction of current traveling across the other magnet of the same pair of magnets, whereby when said second coil arrangement is energized said blade assemblies of the second group can move between the unblocking and blocking conditions as the polarity of current traveling through said second coil is reversed.

* * * * *